United States Patent Office 3,241,905
Patented Mar. 22, 1966

3,241,905
VAT DYE LEVELING WITH COPOLYMERS 2-OXO-N-VINYL HETEROCYCLIC COMPOUND AND ACRYLAMIDES
Oskar Olaj, Vienna, Austria, and Arthur Maeder, Therwil, Switzerland, assignors to Ciba Limited, Basel, Switzerland, a Swiss company
No Drawing. Filed Sept. 24, 1962, Ser. No. 225,900
Claims priority, application Switzerland, Sept. 25, 1961, 11,112/61
6 Claims. (Cl. 8—34)

A number of leveling agents for dyeing textile materials with vat dyestuffs are known, inter alia homopolymers or oligomers of N-vinyl pyrrolidone (see, for example, British specification 735,396 and French specification 1,204,370). Furthermore, it is known to use polymeric vinyl pyrrolidone as a stripping agent in the dyeshop and this is why it is not suitable as a leveling agent for dyeing cotton with vat dyestuffs.

It has been found that certain copolymers of 2-oxo-N-vinyl-heterocyclic compounds, above all selected copolymers of N-vinyl pyrrolidone, are excellent leveling agents for dyeing cotton with vat dyestuffs. From among the large variety of comonomers acrylamide, sodium acrylate and vinyl acetate were found to be suitable for manufacturing particularly efficient leveling agents. As is known, a leveling agent to be suitable must have the property that its presence gives rise to a level dyeing and the exhaustion of the dyestuff—that is to say the share of dyestuff used that remains on the textile material—must be as large as possible. These two demands are of a contradictory nature: As a rule good leveling properties go hand in hand with a poor rate of dyestuff exhaustion. Compared with the oligomers or homopolymers of N-vinyl pyrrolidone level dyeings and very good dyestuff exhaustion are surprisingly achieved by using the aforementioned copolymers.

The present invention provides a process for producing level dyeings on textile fibers, more especially on cotton, with vat dyestuffs, wherein dyeing is performed in the presence of a water-soluble, linear additive copolymer consisting of the following polymeric structural units:

(1) 25 to 70 mol percent of a 2-oxo-N-vinyl-heterocyclic compound which is saturated in the ring,
(2) 30 to 75 mol percent of acrylamide or methacrylamide and/or of an alkali metal salt of acrylic or methacrylic acid, and
(3) 0 to 45 mol percent of vinyl acetate.

Suitable 2-oxo-N-vinyl-heterocyclic compounds are aliphatic heterocyclic compounds containing a saturated ring and 5 or 6 cyclic atoms, one of which is a vinyl-substituted nitrogen atom and in α-position thereto there is a carbonyl group. The other cyclic atoms are carbon, nitrogen or oxygen; the carbon and nitrogen atoms may be substituted by lower alkyl radicals. The 2-oxo-N-vinyl-heterocyclic compounds to be used in the present process correspond to the general formula

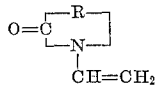

in which R represents a divalent, saturated, possibly substituted aliphatic radical with 3 to 4 carbon atoms of which at most one is replaced by nitrogen or oxygen. For example, R may represent the grouping

—CH$_2$CH$_2$CH$_2$—

(pyrrolidone), —CH$_2$CH$_2$CH$_2$CH$_2$— (piperidone),

—CH$_2$CH$_2$NH—

(pyrazolidone), —NHCH$_2$CH$_2$— (ethyleneurea),

—NHCH$_2$CH$_2$CH$_2$—

(trimethyleneurea) or —OCH$_2$CH$_2$— (oxazolidone).

Examples of suitable compounds are N-vinyl oxazolidone and its 5-methyl or 5-ethyl substitution products, N-vinyl-N:N'-ethyleneurea, N-vinyl-N:N'-trimethyleneurea and more especially N-vinyl pyrrolidone. The copolymers to be used in the present process contain 25 to 70, preferably 30 to 60, mol percent of the vinyl-heterocyclic compound.

The comonomeric component used consists of 30 to 75, preferably 40 to 70, mol percent of acrylamide, methacrylamide and/or an alkali metal salt of acrylic or methacrylic acid, more especially sodium acrylate. The copolymers may have a binary or ternary structure. Suitable compounds are, for example, copolymers of N-vinyl pyrrolidone and acrylamide, or of N-vinyl pyrrolidone and sodium acrylate, or of N-vinyl pyrrolidone, acrylamide and sodium acrylate. If desired, there may be used as a further comonomer in the polymerization up to 45 mol percent of vinyl acetate.

The manufacture of copolymers of the kind to be used in the present process is known. The polymerization is conducted in a solution in an aqueous medium at 40 to 90° C. and with the aid of a water-soluble free-radical catalyst such, for example, as potassium persulfate or azo-bis-isobutyronitrile.

According to the invention the copolymers of the composition defined above are used as leveling agents for vat dyeings. They may be used whenever, owing to the dyestuff and/or material to be dyed, there is a risk of spotty dyeings or whenever such spotty dyeings already exist. It is possible, for example, to add the copolymers to the dyebath, in which case they develop their leveling action already during the dyeing operation. It is further possible to level spotty vat dyeings subsequently with the aid of the copolymers in an alkaline bath containing hydrosulfite. The amount of copolymer to be added to the treatment liquor may vary within wide limits and is advantageously about 0.25 to 5 parts of copolymer in 1000 parts by volume of water. The weaker dyeings, such as result when dyeing is performed with certain vat dyestuffs in hard water (20° German hardness scale), are appreciably improved when the concentration of the copolymer is as little as 0.25 g. per liter.

The present process is particularly suitable for vat dyestuffs that are used in the so-called hot-dyeing method, that is to say at temperatures ranging from 50 to 70°, and advantageously from 55 to 65° C. For machine dyeing the dyebath has a concentration of 1:5 to 1:20 and for piece-dyeing 1:20 to 1:100.

The following vat dyestuffs are, for example, suitable:
(1) The blue dyestuff obtained by stove-melting from methylbenzanthrone.

(2) The black dyestuff (polyanthrimide) prepared from 1 mol of tetrabromopyranthrone, 2 mols of 1-aminoanthraquinone and 2 mols of aminodibenzanthrone.

(3) The violet dyestuff of the formula

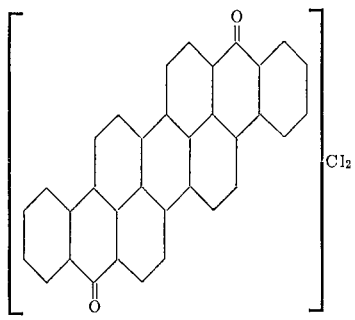

In the following example parts and percentages are by weight, unless otherwise indicated.

EXAMPLE

A dyebath is prepared which contains per liter 16 ml. of sodium hydroxide solution of 30% strength, 1 g. of sodium hydrosulfite, one each of the under-mentioned 12 copolymers and the vat dyestuff obtained by stove-melting from methylbenzanthrone. Two pieces of cotton satin are immersed at an interval of 10 minutes and at a bath temperature of 60 to 65° C. in each dyebath and moved about in it. The goods-to-liquor ratio is in each case 1:80. After 50 minutes the pieces of satin are taken out of the dyebath and the vat dyeing is developed in the usual manner. The pieces of satin are dried and ironed and then examined in a brightness measuring instrument according to Dr. Lange with polydisperse light against barium sulfate as standard ($=100$).

In a parallel experiment the identical procedure is used except that the leveling agent is omitted.

The data listed in the following table refer in all cases to a concentration of the leveling agent of 0.5 g. of active substance in one liter of the under-mentioned copolymers and of the oligomers and homopolymers of N-vinyl pyrrolidone. In column A there is shown the numerical value of the brightness of the first piece of fabric after having been dyed in the presence of the individual leveling agent, and column B contains the numerical value of the brightness of the first piece of fabric treated without addition of a leveling agent. The smaller the difference A–B between the numbers of the two columns, the better is the dyestuff exhaustion or, respectively, the weaker the retentive effect of the dyebath. In column C appears the difference of the numerical values of the brightness of the first and the second piece of fabric of the dyeing performed in the presence of a leveling agent. Accordingly, column C is a measure of the leveling effect achieved. The smaller this difference, the better the leveling effect of the individual agent.

*Copolymers*

(1) Copolymer of 50 mol percent of N-vinyl pyrrolidone and 50 mol percent of acrylamide.

(2) Copolymer of 50 mol percent of N-vinyl pyrrolidone and 50 mol percent of methacrylamide.

(3) Copolymer of 65 mol percent of N-vinyl pyrrolidone and 35 mol percent of acrylamide.

(4) Copolymer of 33 mol percent of N-vinyl pyrrolidone and 67 mol percent of acrylamide.

(5) Copolymer of 25 mol percent of N-vinyl pyrrolidone and 75 mol percent of acrylamide.

(6) Copolymer of 50 mol percent of N-vinyl pyrrolidone and 50 mol percent of sodium acrylate.

(7) Copolymer of 66 mol percent of N-vinyl pyrrolidone and 34 mol percent of sodium acrylate.

(8) Copolymer of 66 mol percent of N-vinyl pyrrolidone and 34 mol percent of sodium methacrylate.

(9) Copolymer of 33 mol percent of N-vinyl oxazolidone and 67 mol percent of acrylamide.

(10) Copolymer of 34 mol percent of N-vinyl pyrrolidone, 33 mol percent of acrylamide and 33 mol percent of vinyl acetate.

(11) Copolymer of 34 mol percent of N-vinyl pyrrolidone, 33 mol percent of acrylamide and 33 mol percent of sodium acrylate.

(12) Copolymer of 50 mol percent of N-vinyl pyrrolidone and 50 mol percent of vinyl acetate.

TABLE

| | A | B | C |
|---|---|---|---|
| Copolymer: | | | |
| 1 | 24 | 12 | 4 |
| 2 | 24 | 12 | 4 |
| 3 | 35 | 12 | 4 |
| 4 | 17 | 12 | 5 |
| 5 | 13 | 10 | 8 |
| 6 | 18 | 10 | 5 |
| 7 | 24 | 10 | 5 |
| 8 | 25 | 10 | 5 |
| 9 | 16 | 10 | 4 |
| 10 | 19 | 10 | 2 |
| 11 | 23 | 10 | 4 |
| 12 | 52 | 10 | 1 |
| Oligomers of N-vinyl pyrrolidone:[1] | | | |
| 1 | 12 | 12 | 22 |
| 2 | 10 | 10 | 21 |
| 3 | 12 | 12 | 19 |
| Homopolymer of N-vinyl pyrrolidone | 72 | 12 | 2 |

[1] Prepared according to German Auslegeschrift 1,040,031: (1) 1%, (2) 0.4% and (3) 0.1% of sulfuric acid (diluted with an equal amount of glacial acetic acid).

The table shows that when the copolymers 1, 2, 3, 7, 8 and 11 are used, very level dyeings are obtained (column C) and, with exception of copolymer 3, only a small share of the dyestuff is retained by the dyebath (column A less column B). The copolymers 4, 5, 6, 9 and 10 display excellent dyestuff exhaustion (column A less column B) and, as a rule, likewise very level dyeings are obtained. When oligomers of N-vinyl pyrrolidone are used, the dyestuff exhaustion is very good but the dyeings are so spotty as to render them useless, while when the corresponding homopolymer is used the exact opposite is found. Copolymer 12 demonstrates that when a binary copolymer is used in which component (2) has been replaced by another water-soluble monomer, namely vinyl acetate, the dyestuff exhaustion is unsatisfactory.

What is claimed is:

1. A process for producing level dyeings on textiles from cotton with vat dyestuffs in which process dyeing is performed in the presence of a linear additive copolymer of a 2-oxo-N vinyl-heterocyclic compound which is present in the dye-bath in an amount of 0.25 to 5 parts per 100 parts of water, the copolymer being selected from the group consisting (a) of a copolymer which consists of polymeric structural units (1) of 25 to 70 mol percent of an aliphatic ring-saturated 2-oxo - N - vinyl - heterocyclic compound of 5 to 6 ring atoms, (2) of 30 to 75 mol percent of an amide selected from the group consisting of acrylamide and methacrylamide, and of (3) 0 to 45 mol percent of vinyl acetate, and (b) of a copolymer which consists of polymeric structural units (1) of 25 to 70 mol percent of an aliphatic ring-saturated 2-oxo - N - vinyl - heterocyclic compound of 5 to 6 ring atoms, (2) of 30 to 75 mol percent of the sodium salt of an acid selected from the group consisting of acrylic and methacrylic acid, and (3) of 0 to 45 mol percent of vinyl acetate.

2. A process for producing level dyeings on textiles from cotton with vat dyestuffs in which process dyeing is performed in the presence of a linear additive copolymer of a 2-oxo-N-vinyl-heterocyclic compound which is present in the dye-bath in an amount of 0.25 to 5 parts per 1000 parts of water, the copolymer being selected from the group consisting
  (a) of a copolymer which consists of polymeric structural units of 25 to 70 mol percent of an aliphatic ring-saturated 2-oxo - N - vinyl - heterocyclic compound of 5 to 6 ring atoms and of 30 to 75 mol percent of an amide selected from the group consisting of acrylamide and methacrylamide, and
  (b) of a copolymer which consists of polymeric structural units of 25 to 70 mol percent of an aliphatic ring-saturated 2-oxo - N - vinyl - heterocyclic compound of 5 to 6 ring atoms and of 30 to 75 mol percent of the sodium salt of an acid selected from the group consisting of acrylic acid and methacrylic acid.

3. A process for producing level dyeings on textiles from cotton with vat dyestuffs in which process dyeing is performed in the presence of a linear additive copolymer of a 2-oxo-N-vinyl-heterocyclic compound which is present in the dye-bath in an amount of 0.25 to 5 parts per 1000 parts of water, the copolymer being selected from the group consisting
  (a) of a copolymer which consists of polymeric structural units (1) of 25 to 70 mol percent of N-vinylpyrrolidone, (2) of 30 to 75 mol percent of acrylamide, and of (3) 0 to 45 mol percent of vinyl acetate, and
  (b) of a copolymer which consists of polymeric structural units (1) of 25 to 70 mol percent of N-vinylpyrrolidone, (2) of 30 to 75 mol percent of the sodium salt of acrylic acid, and (3) of 0 to 45 mol percent of vinyl acetate.

4. A process for producing level dyeings on textiles from cotton with vat dyestuffs in which process dyeing is performed in the presence of a linear additive copolymer of a 2-oxo-N-vinyl-heterocyclic compound which is present in the dye-bath in an amount of 0.25 to 5 parts per 1000 parts of water, the copolymer being selected from the group consisting
  (a) of a copolymer which consists of polymeric structural units of 25 to 70 mol percent of N-vinylpyrrolidone and of 30 to 75 mol percent of acrylamide, and
  (b) of a copolymer which consists of polymeric structural units of 25 to 70 mol percent of N-vinylpyrrolidone and of 30 to 75 mol percent of the sodium salt of acrylic acid.

5. A process for producing level dyeings on textiles from cottom with vat dyestuffs in which process dyeing is performed in the presence of a linear additive copolymer of a 2-oxo-N-vinyl-heterocyclic compound which is present in the dye-bath in an amount of 0.25 to 5 parts per 1000 parts of water, the copolymer consisting of polymeric structural units of 25 to 70 mol percent of N-vinyl-pyrrolidone and of 30 to 75 mol percent of acrylamide.

6. A process for producing level dyeings on textiles from cotton with vat dyestuffs in which process dyeing is performed in the presence of a linear additive copolymer of a 2-oxo-N-vinyl-heterocyclic compound which is present in the dye-bath in an amount of 0.25 to 5 parts per 1000 parts of water, the copolymer consisting of polymeric structural units of 25 to 70 mol percent of N-vinyl-pyrrolidone and of 30 to 75 mol percent of sodium acrylate.

References Cited by the Examiner

UNITED STATES PATENTS

| | | | |
|---|---|---|---|
| 1,923,243 | 9/1933 | Ulrich | 8—34 |
| 2,861,863 | 11/1958 | Schuster | 8—100 |
| 2,890,092 | 6/1959 | Mautner | 8—34 |
| 2,903,325 | 9/1959 | Geigy | 8—85 |
| 2,931,698 | 4/1960 | Messer | 8—4 |
| 2,953,422 | 9/1960 | Posselt | 8—85 |
| 2,955,008 | 10/1960 | Mautner | 8—85 |
| 2,971,812 | 2/1961 | Moran | 8—85 |
| 2,989,360 | 6/1961 | Mautner | 8—85 |
| 3,022,265 | 2/1962 | Stanton et al. | 8—100 |

FOREIGN PATENTS 502,185 7/1952 Belgium.

OTHER REFERENCES

Jour. Soc. Dyers and Colourists; April 1960, page 252,
Melliand Textile Berichte, January 1951, pages 53–56.

ALEXANDER D. RICCI, *Primary Examiner.*

ABRAHAM H. WINKELSTEIN, A. LOUIS MONACELL, NORMAN G. TORCHIN, *Examiners.*

D. LEVY, *Assistant Examiner.*